Dec. 28, 1926.  
W. E. FELDMAN  
AIR HEATING SYSTEM  
Filed Feb. 14, 1925

Inventor  
William E. Feldman  
By Herbert E. Smith  
Attorney

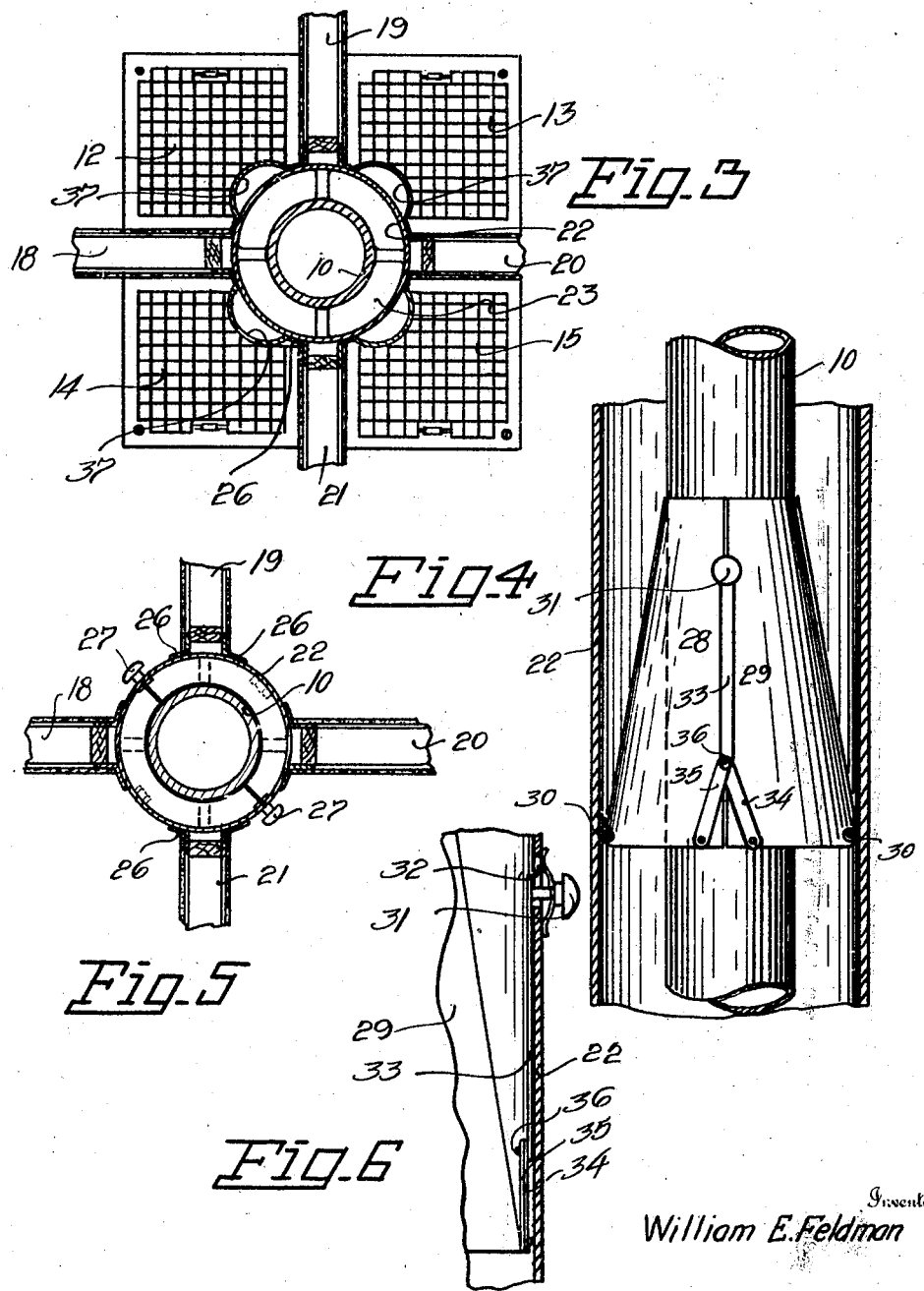

Patented Dec. 28, 1926.

1,612,108

UNITED STATES PATENT OFFICE.

WILLIAM E. FELDMAN, OF SPOKANE, WASHINGTON.

AIR HEATING SYSTEM.

Application filed February 14, 1925. Serial No. 9,316.

My present invention relates to improvements in air heating systems of the ventilating type and utilizing a hot air furnace as the source of heat for heating dwellings and other buildings adapted for the purpose.

In carrying out my invention I utilize a hot air furnace enclosed within an air heating chamber which is adapted to receive cold air either from the exterior atmosphere, or by circulation from the interior of the house or dwelling.

Means are provided in the air heating chamber for humidifying the air as it is heated, and the gases of combustion passing from the furnace to the smoke pipe are utilized to radiate heat from the smoke pipe, which latter pipe extends in a vertical direction from the furnace through the building to an upper chimney section.

A heating drum is used in connection with the smoke pipe for heating the first floor rooms or compartments and a specially formed radiator for heat is utilized in connection with the smoke pipe for heating a room on the second floor of the dwelling. Hot air flues are also utilized for distributing heated air throughout the rooms or compartments of the second floor and additional means are utilized for distributing the heated air to rooms on the first floor.

The distribution of heat and circulation of air throughout the entire building or dwelling may with facility be efficiently controlled and the dwelling maintained at a required uniform temperature by a maximum use of the generated heat with a minimum fuel consumption. The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 3 is a floor plan view with parts in section showing the corners of four adjoining rooms with heat registers and radiators therefor.

Figure 4 is an enlarged detail vertical sectional view of a portion of the heating drum disclosing a damper therein, in closed position.

Figure 5 is a transverse sectional view of a portion of the hot air drum illustrating the manner of supporting the drum and a smoke pipe therein.

Figure 6 is a detail sectional view of the damper of Figure 4.

Figures 1, 2:
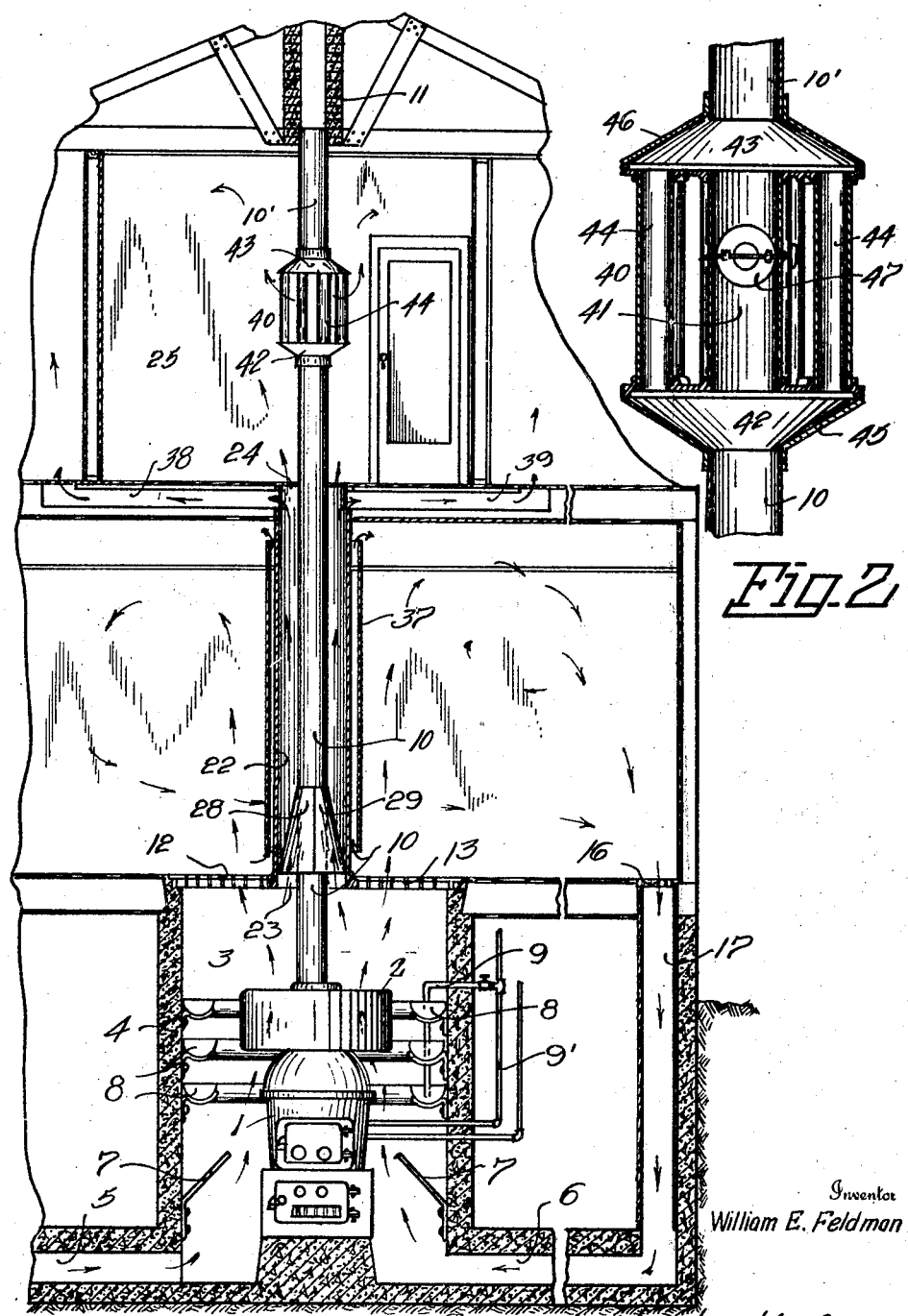
Figure 1 is a vertical sectional view through a portion of a two-story dwelling showing the installation of my hot air heating system.
Figure 2 is an enlarged detail sectional view of one of the heat radiators used in connection with the smoke pipe.

While the invention is adapted for various buildings I have illustrated herein a two story dwelling having a basement in which the hot air furnace designated by the numeral 1 may be of any suitable or standard type and using an air drum 2. The furnace is enclosed within a heating chamber 3 having walls 4 and this chamber is of the desired size for heating cold air passed thereto. Preferably the chamber is rectangular with concrete walls and of course provided with a door for access to the furnace. Under normal conditions the door is kept closed and the chamber is otherwise closed except for the air ducts as will be described.

Cold air from the exterior atmosphere may be conducted to the heating chamber through a cold air duct 5 built into the floor of the cellar, or cold air may be conducted to the heating chamber though a cold air duct 6 having communication with the first story of the dwelling.

As the cold air enters from either of these ducts and rises from the bottom of the heating chamber it is deflected toward the furnace by deflecting plates 7 attached to the walls of the chamber, as in Figure 1. These deflecting plates cause the air currents to pass in close proximity to the furnace from which heat is radiated and heated air currents pass up through the chamber as indicated by the arrows.

For humidifying or moistening the heated air I employ a series of water troughs 8 arranged in tiers, three in number, around the walls of the heating chamber, from which, by evaporation the moisture is carried by the upwardly moving air currents. Water to the troughs is supplied through the branch pipe 9 from the usual water pipes 9′ of the dwelling.

The smoke pipe 10 10′ rises vertically from the furnace and extends directly through the dwelling to a brick chimney 11 passing through the roof and supported in suitable manner. The top section 10′ of the pipe telescopes in the chimney and said section may be removed, when it is desired to dismantle the heating appliance, by first elevating the pipe section into the chimney to detach it from the remainder of the heating plant, and then withdrawing it from the chimney.

The smoke pipe rises through the first story of the dwelling in such manner as to radiate heat to several rooms, and these rooms, four in number as indicated in the drawings, are each provided with a floor register as 12, 13, 14, 15, which close the top of the heating chamber, if desired, or may be opened for passage therethrough of air currents from the heating chamber to the several rooms as indicated by the arrows in Figure 1. These registers, or group of registers, are built into the first floor of the dwelling and heat is distributed from the four adjoining corners of the respective rooms, the air circulating as indicated by the arrows in Figure 1. At 16 a floor grate is provided which admits cool air from near the floor to the cool air flue 17 which communicates with the horizontally extending cold air flue 6. The air currents are thus caused to circulate from the furnace, through the four registers and the several rooms, and thence back to the heating chamber by way of the down draft flue 17 and cold air flue 6.

The intersecting partitions of the four first floor rooms are indicated in Figure 3 by the numerals 18, 19, 20 and 21, and it will be seen that the smoke pipe rises vertically through the junction of these four partitions which are cut away or rather so built and constructed as to accommodate the smoke pipe and also a heating drum 22 which surrounds the smoke pipe and is designed to heat the four adjoining rooms in addition to the heat supplied through the four floor registers 12, 13, 14 and 15.

The heating drum which is cylindrical in cross section surrounds the smoke pipe and has a bottom opening 23 to the air heating chamber 3 and a top opening 24 on a level with the second floor of the dwelling for conveying hot air directly from the heating chamber to the second floor rooms or compartments, one of the rooms being indicated as 25.

By means of the exterior brackets 26 the drum is attached to the four partitions, and by means of bolts or retaining pins 27 the drum is centered in concentric position around the smoke pipe, as seen in Figure 5.

The movement of air currents up through the drum may be controlled by a damper best shown in Figure 4, which is of conical formation when closed and located between the walls of the smoke pipe and the drum, preferably just above the opening 23 to the air heating chamber. This conical or frustoconical damper is made in sections, preferably two as 28 and 29, the two halves at their upper ends conforming to the periphery of the smoke pipe and the two halves at their lower ends conforming to the inner periphery of the drum. At their lower larger ends the sections are hinged at 30 to the inner faces of the drum and the upper free ends of the two halves are designed to swing on these hinges away from or toward the smoke pipe. By means of a lifting knob 31 which projects laterally through a slot 32 in the drum (Fig. 6) a draw link 33 and a pair of pivoted links 34 and 35 the damper is manipulated. The links 34 and 35 are pivoted at 36 to the draw link 33 and also pivoted to the respective sections 29 and 28 of the damper. By pulling up on the knob 31 in Figure 4 it will be apparent that the damper will be opened for free passage of air currents through the drum as indicated by the arrows in Figure 1.

The air heating drum 22 is utilized to heat the four first floor rooms and for this purpose a hot air duct 37 is attached to the exterior of the drum in a corner of each of the four rooms (Figure 3). These four ducts have open bottom ends terminating just above the first floor and open top ends terminating just below the ceiling of the first floor rooms to cause circulation of air in the several rooms as indicated in Figure 1.

For heating second floor rooms other than the room 25 I provide lateral hot air ducts 38 and 39 projected from the top portion of the heating drum and located in the floor of the second story with floor outlets to the respective rooms as shown.

In addition to the use of the drum for conveying hot air to the second floor room 25, I employ a radiator indicated as a whole by the numeral 40 which is interposed between the pipe sections 10 and 10′. As best seen in Figure 2 this radiator is located at the desired level in the room and comprises a central smoke flue 41 alined with the two smoke pipe sections 10 and 10′. The radiator has a lower horizontal perforated plate 42 and an upper perforated plate 43 in the shape of disks, and between these perforated plates is arranged an annular series of short radiator pipes 44 spaced somewhat from the central flue 41. Tapering flanges 45 and 46 at the respective lower and upper ends of the radiator connect it with the smoke pipe sections, and it will be apparent that the gases of combustion will pass not only up through the central flue 41 but also through the pipes 44 and from all these elements heat is radiated to the room 25. By means of a damper 47 in the central flue the draft may be cut off therefrom and the gases of combustion directed entirely through the radiator pipes 44.

From the above description taken in connection with my drawings it will be apparent that I have provided a heating system whereby the entire dwelling may be uniformly heated or the circulation of air cut off from one portion and concentrated in another portion or portions of the dwelling.

The heating plant is compactly arranged and does not occupy undue space, and further it may be dismantled as for cleaning the pipes and flues or for storing parts away when not in use.

By first removing the pipe section 10′ as described, the radiator in the second story may be removed from the pipe section 10, and then said section may be detached from the furnace and removed, for cleaning and storing, until further needed. The hot air conveyers as well as cold air conveyers may readily be cleaned, and all openings, if desired, closed in some usual manner when the plant is not in use.

Having thus fully described my invention what I claim as new and desire to secure by Letters Patent is:—

1. An appliance for distributing heat to adjacent rooms of a building comprising a heating chamber and a furnace therein and a plurality of registers in the top wall of the chamber, a smoke pipe rising centrally through the chamber from the furnace, a drum encasing the smoke pipe above the registers, said drum opening into the chamber, and a damper in the drum above said opening.

2. An appliance for distributing heat to adjacent rooms of a building comprising a heating chamber, a furnace therein, and a plurality of registers in the top wall of said chamber, a smoke pipe from the furnace rising centrally through an opening in the top wall, a drum encasing the smoke pipe, supported on the top wall and located above the opening therein, a damper in the drum above said opening, and a plurality of hot air ducts having open upper and lower ends attached to the exterior of the drum above said registers.

In testimony whereof I affix my signature.

WILLIAM E. FELDMAN.